(12) United States Patent
Yoshioka

(10) Patent No.: US 8,214,211 B2
(45) Date of Patent: Jul. 3, 2012

(54) VOICE PROCESSING DEVICE AND PROGRAM

(75) Inventor: Yasuo Yoshioka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 957 days.

(21) Appl. No.: 12/198,232

(22) Filed: Aug. 26, 2008

(65) Prior Publication Data
US 2009/0063146 A1 Mar. 5, 2009

(30) Foreign Application Priority Data

Aug. 29, 2007 (JP) .................................. 2007-222669

(51) Int. Cl.
*G06F 17/27* (2006.01)
*G10L 15/00* (2006.01)
*G10L 11/00* (2006.01)

(52) U.S. Cl. ............ 704/239; 704/9; 704/200; 704/236; 704/270

(58) Field of Classification Search .................. None
See application file for complete search history.

(56) References Cited

U.S. PATENT DOCUMENTS

| | | | | | |
|---|---|---|---|---|---|
| 4,653,098 | A | * | 3/1987 | Nakata et al. ................. | 704/207 |
| 5,765,127 | A | * | 6/1998 | Nishiguchi et al. ........... | 704/208 |
| 5,878,388 | A | * | 3/1999 | Nishiguchi et al. ........... | 704/214 |
| 5,960,388 | A | * | 9/1999 | Nishiguchi et al. ........... | 704/208 |
| 5,960,391 | A | * | 9/1999 | Tateishi et al. ................ | 704/232 |
| 6,081,660 | A | * | 6/2000 | Macleod et al. ................. | 703/2 |
| 6,510,410 | B1 | * | 1/2003 | Chen et al. .................... | 704/251 |
| 6,529,875 | B1 | * | 3/2003 | Nakajima et al. ............. | 704/275 |
| 6,928,406 | B1 | | 8/2005 | Ehara et al. | |
| 7,389,230 | B1 | * | 6/2008 | Nelken ........................ | 704/255 |
| 2002/0007270 | A1 | | 1/2002 | Murashima | |
| 2003/0110038 | A1 | * | 6/2003 | Sharma et al. ................ | 704/270 |
| 2003/0144841 | A1 | * | 7/2003 | Shao ............................ | 704/251 |
| 2003/0233233 | A1 | | 12/2003 | Hong | |
| 2004/0006478 | A1 | * | 1/2004 | Alpdemir et al. ............ | 704/275 |
| 2004/0030550 | A1 | | 2/2004 | Liu et al. | |

(Continued)

FOREIGN PATENT DOCUMENTS

JP 60129795 7/1985

(Continued)

OTHER PUBLICATIONS

Nakagawa, Seiichi, Speaker Identification by Combining Speaker Specific GMM with Speaker Adapted Syllable-based HMM, Department of Information and Computer Sciences, Japan, pp. 31-36, May 2003.

(Continued)

*Primary Examiner* — Justin Rider
(74) *Attorney, Agent, or Firm* — Morrison & Foerster LLP

(57) ABSTRACT

In a voice processing device, a male voice index calculator calculates a male voice index indicating a similarity of the input sound relative to a male speaker sound model. A female voice index calculator calculates a female voice index indicating a similarity of the input sound relative to a female speaker sound model. A first discriminator discriminates the input sound between a non-human-voice sound and a human voice sound which may be either of the male voice sound or the female voice sound. A second discriminator discriminates the input sound between the male voice sound and the female voice sound based on the male voice index and the female voice index in case that the first discriminator discriminates the human voice sound.

8 Claims, 6 Drawing Sheets

U.S. PATENT DOCUMENTS

| | | | |
|---|---|---|---|
| 2004/0054527 A1* | 3/2004 | Quatieri, Jr. | 704/207 |
| 2004/0122667 A1* | 6/2004 | Lee et al. | 704/233 |
| 2005/0016360 A1 | 1/2005 | Zhang | |
| 2005/0060158 A1* | 3/2005 | Endo et al. | 704/275 |
| 2008/0235016 A1* | 9/2008 | Paul et al. | 704/246 |
| 2008/0262844 A1* | 10/2008 | Warford et al. | 704/255 |

FOREIGN PATENT DOCUMENTS

| | | |
|---|---|---|
| JP | 61-043798 A | 3/1986 |
| JP | 05-173594 A | 7/1993 |
| JP | 10-282991 A | 10/1998 |
| JP | 11-338496 A | 12/1999 |
| JP | 2000-200100 A | 7/2000 |
| JP | 2000-322097 A | 11/2000 |
| JP | 2001-056699 A | 2/2001 |
| JP | 2001-350488 A | 12/2001 |
| JP | 2005-084660 A | 3/2005 |
| JP | 2005-241833 A | 9/2005 |
| JP | 2006-133284 A | 5/2006 |
| WO | WO-2006/043192 A1 | 4/2006 |

OTHER PUBLICATIONS

Reynolds, Douglas A, Robust Text-Independent Speaker Identification Using Gaussian Mixture Speaker Models, IEEE Transactions on Speech and Audio Processing, vol. 3, No. 1, Jan. 1995, pp. 72-83.

Notification of Reasons for Rejection mailed Dec. 6, 2011, for JP Application No. 2007-222669, with English Translation, nine pages.

European Search Report mailed Sep. 26, 2011, for EP Patent Application No. 08014938.8, seven pages.

Ore, B.M. et al. (2006). "Speaker Segmentation and Clustering Using Gender Information," *IEEE Odyssey—The Speaker and Language Recognition Workshop*, pp. 1-8.

Umapathy, K. et al. (May 2007). "Audio Signal Feature Extraction and Classification Using Local Discriminant Bases," *IEEE Transactions on Audio, Speech, and Language Processing* 15(4):1236-1246.

Notification of Reasons for Rejection mailed Mar. 6, 2012, for JP Application No. 2007-222669, with English Translation, eight pages.

* cited by examiner

VOICE PROCESSING DEVICE AND PROGRAM

BACKGROUND OF THE INVENTION

1. Technical Field

The present invention relates to technology that discriminates sound captured by a sound capturing device (hereinafter referred to as "input sound") according to acoustic properties of the input sound.

2. Technical Background

Technology for discriminating whether an input sound is one of a male voice and a female voice has been proposed hitherto. For example, Japanese Published Unexamined Patent Application No. S60-129795 discloses technology for determining whether an input sound is one of a male voice or a female voice according to a result of a comparison of a distance between the input sound and a male voice standard pattern and a distance between the input sound and a female voice standard pattern.

However, actual input sounds include incidental sounds other than a human voice (hereinafter referred to as "non-human-voice sound") such as environmental sounds incident during sound capturing. Therefore, it is difficult to discriminate with high accuracy between a male voice and a female voice only by simply comparing the input sound and by simply comparing the captured input sound with each of the male voice standard pattern and the female voice pattern.

SUMMARY OF THE INVENTION

In consideration of the above circumstances, one object of the present invention is to solve the problem of appropriately discriminating between a male voice and a female voice even in the case where the input sound includes a non-human-voice sound.

To achieve the above object, a voice processing device according to the present invention is provided for discriminating an input sound among a male voice sound, a female voice sound and a non-human-voice sound other than the male voice sound and the female voice sound. The inventive voice processing device comprises: a storage that stores a male speaker sound model created from sounds voiced from a plurality of male speakers and a female speaker sound model created from sounds voiced from a plurality of female speakers; a male voice index calculator that calculates a male voice index indicating a similarity of the input sound relative to the male speaker sound model; a female voice index calculator that calculates a female voice index indicating a similarity of the input sound relative to the female speaker sound model; a first discriminator that discriminates the input sound between the non-human-voice sound and a human voice sound which may be either of the male voice sound or the female voice sound; and a second discriminator that discriminates the input sound between the male voice sound and the female voice sound based on the male voice index and the female voice index in case that the first discriminator discriminates the human voice sound.

According to the above configuration, the input sound is discriminated between a male voice and a female voice in the case where the first discriminator discriminates a human voice, and therefore the discrimination can be made appropriately between a male voice and a female voice even in the case where the input sound includes a non-human-voice sound. Moreover, the storage may be a memory region defined in one storage unit or a memory region defined dispersively over a plurality of storage units.

A voice processing device according to a favorable aspect of the present invention, further comprises a stability index calculator that calculates a stability index indicating a stability of a characteristic parameter of the input sound along passage of time, wherein the first discriminator discriminates the input sound between the non-human-voice sound and the human voice sound based on the stability index.

For example, in the case where a premise is set forth that the stability of a human voice sound is higher than that of a non-human-voice sound, the first discriminator determines the input sound to be a human voice in the case where the stability index is on a stable-side of the threshold, and determines the input sound to be a non-human-voice sound in the case where the stability index is on an unstable-side of the threshold. "In the case where the stability index is on a stable-side of the threshold" means the case where the stability index exceeds the threshold in a configuration that calculates the stability index by correspondingly increasing the stability index as the stability of the input sound increases, and also means the case where the stability index is below the threshold in a configuration that calculates the stability index by correspondingly decreasing the stability index as the stability of the characteristic parameter of the input sound increases.

For example, the stability index calculator obtains a difference of the characteristic parameter of the input sound between a preceding frame and a succeeding frame which are successively selected from a plurality of frames which are obtained by sequentially dividing the input sound, and calculates the stability index by averaging the differences of the characteristic parameter of the input sound over the plurality of the frames. The first discriminator determines the input sound to be the human voice sound in case that the stability index is lower than a threshold value and determines the input sound to the non-human-voice sound in case that the stability index exceeds the threshold value.

A voice processing device according to a favorable aspect of the present invention further comprises a voice presence index calculator that calculates a voice presence index according to a ratio of a number of frames containing a voiced sound relative to a plurality of frames which are obtained by sequentially dividing the input sound, wherein the first discriminator discriminates the input sound between the non-human-voice sound and the human voice sound based on the voice presence index.

For example, in the case where a premise is set forth that the ratio of voiced sound frames for a human voice is higher than that of a non-human-voice, the first discriminator determines the input sound to be a human voice in the case where the voice presence index is on one side of the threshold having an increasing ratio of voiced-sound frames, and determines the input sound to be a non-human voice in the case where the voice presence index is on the other side of the threshold having a decreasing ratio of voiced-sound frames. "The case where the voice presence index is on a side of the threshold having an increasing ratio of voiced-sound frames" refers to the case where the voice presence index exceeds the threshold in a configuration that calculates the voice presence index by correspondingly increasing the voice presence index as the ratio of voiced-sound frames increases, and means the case where the voice presence index is below the threshold in a configuration that calculates the voice presence index by correspondingly decreasing the voice presence index as the ratio of voiced-sound frames increases.

In a voice processing device according to a favorable aspect of the present invention, the first discriminator uses a threshold which defines a similarity range and a non-similarity range of the male voice index and the female voice index, and determines the input sound to be the human voice sound in case that one of the male voice index and the female voice index is in the similarity range, and otherwise determines the input sound to be the non-human-voice sound in case that both of the male voice index and the female voice index are in the non-similarity range.

For the male voice index and the female voice index, "the case of being in the similarity range" means the case where the male voice index and the female voice index, respectively, exceed a threshold in a configuration that correspondingly increases the male voice index and the female voice index as the input sound similarity to the male speaker sound model and the female speaker sound model increases, respectively, and also means the case where the male voice index and the female voice index, respectively, are below the threshold in a configuration that correspondingly decreases the male voice index and the female voice index as the input sound similarity to the male speaker sound model and the female speaker sound model increases, respectively. In the former configuration, a typical configuration calculates an average likelihood of a probability model such as a Gaussian mixture model and the input sound as the male voice index and the female voice index; and in the latter configuration, a typical configuration calculates a VQ distortion of a VQ codebook and the input sound as the male voice index and the female voice index.

A voice processing device according to a favorable aspect of the present invention further comprises: a pitch detector that detects a pitch of the input sound; and an adjuster that adjusts the male voice index toward a similarity side in case that the detected pitch is below a predetermined value, and adjusts the female voice index toward a similarity side in case that the detected pitch exceeds a predetermined value, wherein the second discriminator discriminates the input sound between the male voice sound and the female voice sound based on either of the adjusted male voice index and the adjusted female voice index.

According to the above aspect, the male voice index and the female voice index are adjusted (compensated) according to the pitch of the input sound, and therefore the reliability of the discrimination between a male voice and a female voice can be improved. For the male voice index and the female voice index, "changing toward a similarity side" means increasing the male voice index and the female voice index in a configuration that correspondingly increases the male voice index and the female voice index as the input sound similarity to the male speaker sound model and the female speaker sound model increases, respectively, and also means decreasing the male voice index and the female voice index in a configuration that correspondingly decreases the male voice index and the female voice index as the input sound similarity to the male speaker sound model and the female speaker sound model increases, respectively.

A voice processing device according to a favorable aspect of the present invention further comprises a signal processor that executes different processing of the input sound according to discrimination results of the first discriminator and the second discriminator.

According to this aspect, the processing of the input sound is controlled according to the results of the discrimination of the input sound (whether it is discriminated among one of a non-human-voice sound, a male voice sound, and a female voice sound), and therefore processing suitable for the properties of the input sound can be executed.

A voice processing device according to each aspect above may be realized by hardware (electronic circuits) such as a DSP (digital signal processor) that may be dedicated to the processing of voices, and also may be realized by the cooperation of a versatile processing device such as a CPU (central processing unit) and a program.

A machine readable medium is provided for use in a computer, the medium containing program instructions executable by the computer to perform: a male voice index calculation processing of calculating a male voice index indicating a similarity of an input sound relative to a male speaker sound model created from a plurality of male voice sounds; a female voice index calculation processing of calculating a female voice index indicating a similarity of the input sound relative to a female speaker sound model created from a plurality of female voice sounds; a first discrimination processing of discriminating the input sound between a human voice sound and a non-human-voice sound; and a second discrimination processing of discriminating the input sound between a male voice sound and a female voice sound based on the male voice index and the female voice index in case that the first discrimination processing discriminates the human voice sound.

The above program also provides similar operations and effects as those of the voice processing device according to the present invention. The program of the present invention may be stored in a computer-readable recording medium, provided to a user as such, and installed into a computer; or may be provided from a server device as a distribution via a communication network and installed into a computer. Moreover, the present invention may be identified also as a program for causing a computer to function as the voice processing device.

DETAILED DESCRIPTION OF TH INVENTION

A: First Exemplary Embodiment

Figure 1:
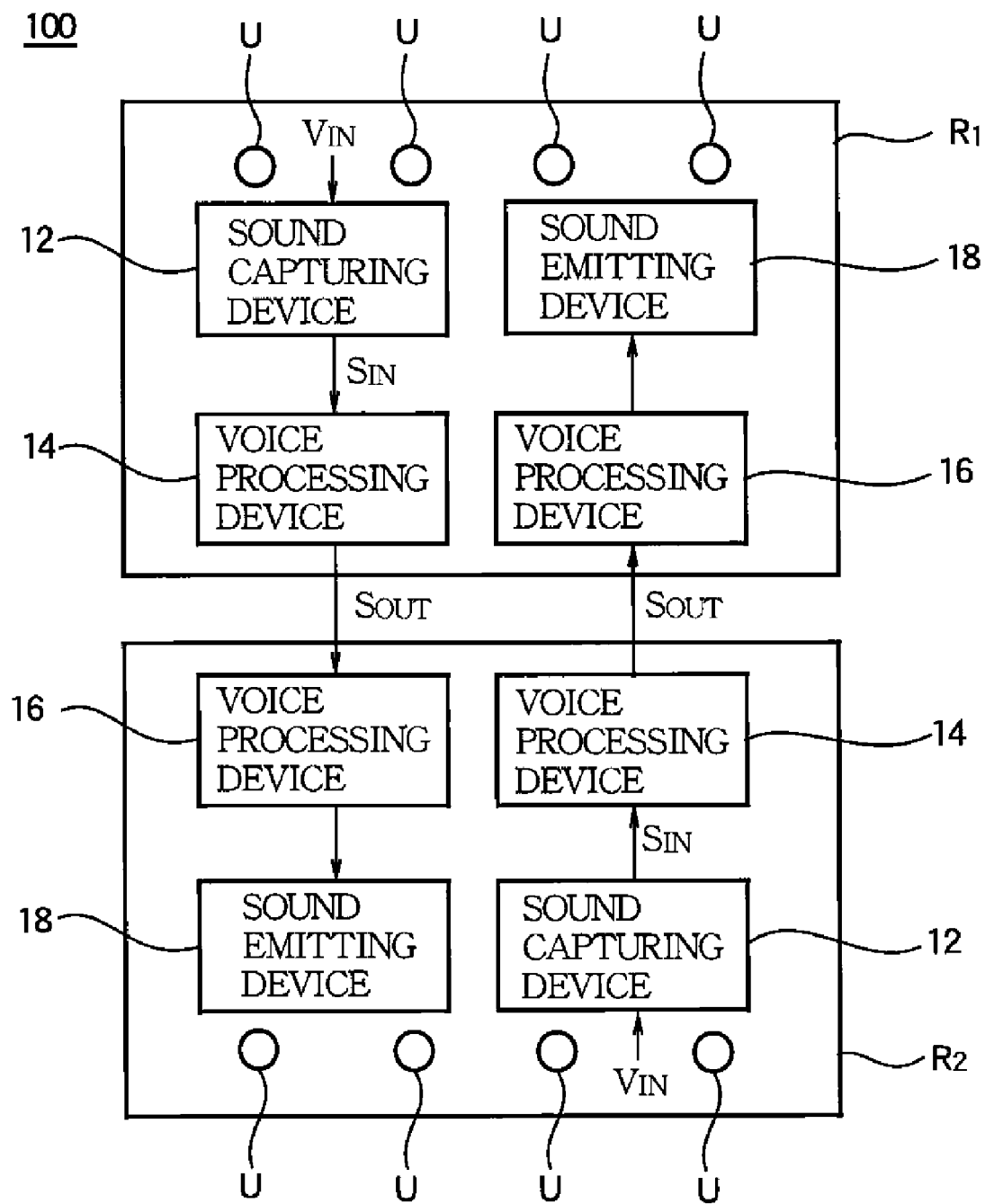
FIG. 1 is a block diagram illustrating a configuration of a teleconference system according to a first exemplary embodiment of the present invention.

FIG. 1 is a block diagram of a teleconference system according to a first exemplary embodiment of the present invention. A teleconference system 100 is a system for transmitting voices mutually among a plurality of users U (participants of a conference) in geographically remote rooms $R_1$ and $R_2$. A sound capturing device 12, a voice processing device 14, a voice processing device 16, and a sound emitting device 18 are placed in each of the rooms $R_1$ and $R_2$.

The sound capturing device 12 is a microphone for creating a voice signal $S_{IN}$ representing the waveform of a voice sound (hereinafter referred to as "input sound") $V_{IN}$ inside the room R. The voice processing device 14 of each of the room $R_1$ and the room $R_2$ creates a voice signal $S_{OUT}$ from the voice signal $S_{IN}$ and sends it to the voice processing device 16 of the other room $R_1$ or room $R_2$, respectively. The voice processing device 16 amplifies the voice signal $S_{OUT}$ and outputs to the sound emitting device 18. The sound emitting device 18 is a speaker for emitting sound waves according to the amplified voice signal $S_{OUT}$ supplied from the voice processing device 16. By the above configuration, the vocal sounds of each of the users U in the room $R_1$ are output from the sound emitting device 18 in the room $R_2$, and the vocal sounds of each of the users U in the room $R_2$ are output from the sound emitting device 18 in the room $R_1$.

Figure 2:
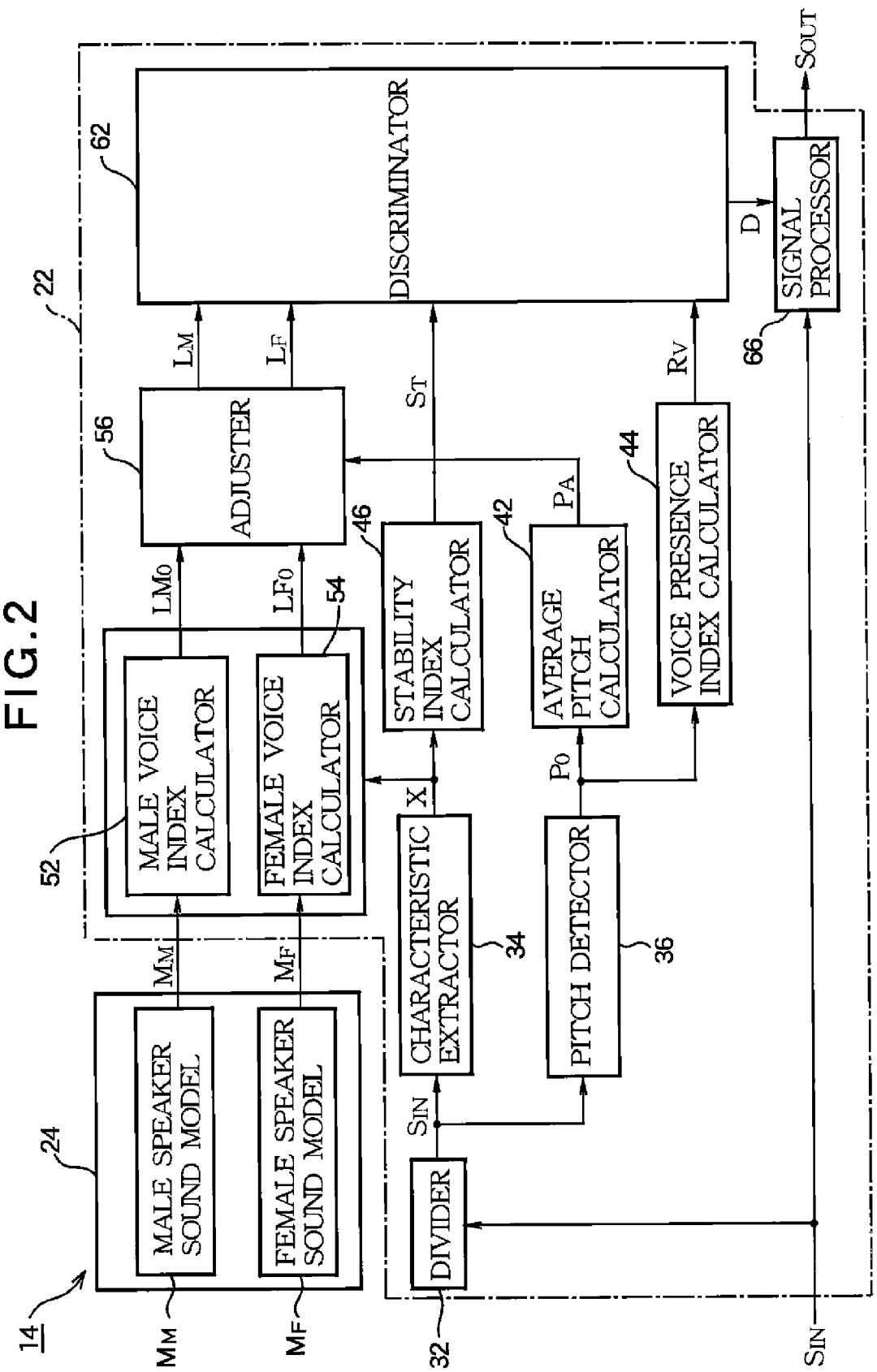
FIG. 2 is a block diagram illustrating a configuration of a voice processing device contained in the teleconference system.

FIG. 2 is a block diagram illustrating the configuration of the voice processing device 14 placed in each of the room $R_1$ and the room $R_2$. As illustrated in this drawing, the voice processing device 14 includes a controlling unit 22 and a storage unit 24. The controlling unit 22 is a processing unit that executes a program. The storage unit 24 stores the program executed by the controlling unit 22 and various data used by the controlling unit 22. Any known storage medium such as a semiconductor storage unit or a magnetic storage unit may be used as the storage unit 24.

The storage unit 24 stores a male speaker sound model $M_M$ and a female speaker sound model $M_F$. The male speaker sound model $M_M$ models average acoustic properties of vocal sounds sampled from a plurality of men. The female speaker sound model $M_F$ models average acoustic properties of vocal sounds sampled from a plurality of women. The male speaker sound model $M_M$ and the female speaker sound model $M_F$ of this exemplary embodiment are probability models that model distributions of voice characteristic parameters (for example, a characteristic vector typified by an MFCC (mel-frequency cepstrum coefficient)) as a weighted sum of a probability distribution. For example, a Gaussian Mixture Model λ, expressed by the following formula (1) as a weighted sum of an M number of normal distributions (M being a natural number), may be favorably used as the male speaker sound model $M_M$ or the female speaker sound model $M_F$.

$$\lambda = \{p_i, \mu_i, S_i\} \ (i=1 \text{ to } M) \quad (1)$$

In formula (1), $p_i$ is a weight (weighting value) of the ith normal distribution. The gross sum of the weights $p_1$ through $p_M$ is unity. In formula (1), $\mu_i$ is a mean vector of the ith normal distribution, and $S_i$ is a covariance matrix of the ith normal distribution.

The detail of Gaussian Mixture Model is disclosed for example in the following paper: IEEE TRANSACTIONS ON SPEECH AND AUDIO PROCESSING, VOL. 3, NO. 1, Jan. 1995, Robust Text-Independent Speaker Identification Using Gaussian Mixture Speaker Models, Douglas A. Reynolds, and Richard C. Rose. The contents of this paper is incorporated in the specification by referencing thereto.

The controlling unit 22 executes a program and thereby functions as the respective constituents of FIG. 2. Elaborating further, the controlling unit 22 realizes a function that discriminates whether the input sound $V_{IN}$ is one of a vocal sound of a man (male voice), a vocal sound of a woman (female voice), and a sound other than a human voice (non-human voice), and a function that executes processing of the voice signal $S_{IN}$ according to the discriminated attribute of the input sound $V_{IN}$ (whether it is one of a male voice, a female voice, and a non-human voice). The constituents of the controlling unit 22 may be realized by electronic circuits such as DSPs. Furthermore, the constituents may be dispersed and implemented in distinct integrated circuits.

A divider 32 of FIG. 2 divides the voice signal $S_{IN}$ (input sound $V_{IN}$) into a plurality of blocks along the time axis. The attribute of the voice signal $S_{IN}$ is determined for each block. Each block has an interval of a predetermined length (for example, one second) defined to prevent overlapping with each other. Furthermore, the divider 32 divides the voice signal $S_{IN}$ into a plurality of frames. Each block includes an N number of frames (N being a natural number). However, a configuration may be used wherein the total number of frames differs among blocks (in other words, each block is of a variable length).

A characteristic extractor 34 extracts acoustic characteristic parameters of the input sound $V_{IN}$ for each frame of the voice signal $S_{IN}$ as a vector (hereinafter referred to as "characteristic vector") X. A characteristic of a similar kind as the characteristic used for creating the male speaker sound model $M_M$ and the female speaker sound model $M_F$ (for example an MFCC) is extracted as the characteristic vector X. A pitch detector 36 detects a pitch (fundamental frequency) $P_0$ for each frame of the voice signal $S_{IN}$. Any known technology may be used for the extraction of the characteristic vector X by the characteristic extractor 34 and the detection of the pitch $P_0$ by the pitch detector 36. An average pitch calculator 42 calculates for each block an average (hereinafter referred to as "average pitch") $P_A$ of the pitch $P_0$ detected by the pitch detector 36 for the N frames of each block.

A voice presence index calculator 44 calculates a voice presence index $R_V$ for each block of the voice signal $S_{IN}$. The voice presence index $R_V$ is a ratio of a number of voiced-sound frames $N_V$ in the N frames of the block ($R_V = N_V/N$). The voice presence index calculator 44 calculates the voice presence index $R_V$ by determining, as voiced-sound frames, the frames for which the pitch detector 36 detects a significant pitch $P_0$. However, any known technology may be used for determining whether the input sound $V_{IN}$ of each frame is a voiced sound or a non-voiced sound. Human voices have a tendency for a high ratio of voice sounds as compared to non-human voices. Therefore, the voice presence index $R_V$ of a human voice is larger than the voice presence index $R_V$ of a non-human-voice sound.

A stability index calculator 46 of FIG. 2 calculates a stability index $S_T$ of each block based on the characteristic vectors X extracted by the characteristic extractor 34. The stability index $S_T$ is a numerical value serving as an index of the temporary stability (the occurrence number of changes and amount of change) of the characteristic parameters of the input sound $V_{IN}$ within the block. The following formula (2), for example, may be used for calculating the stability index $S_T$.

$$S_T = \frac{1}{N-1} \sum_{t=1}^{N-1} d(X[t+1], X[t]) \quad (2)$$

X[t] of formula (2) is a characteristic vector X extracted from the tth frame of the N frames comprising the block. Furthermore, d(X[t+1],X[t]) of formula (2) is a distance (for example, a Euclidean distance) between the characteristic vector X[t+1] and the characteristic vector X[t]. As can be understood from formula (2), larger differences between characteristic vectors X of adjacent frames within a block (in other words, an unstable input sound $V_{IN}$ of the block) result in a corresponding increase of the stability index $S_T$. Non-human-voice sounds often have unstable properties compared to human voice sounds, and therefore the stability index $S_T$ of a non-human-voice sound tends to be larger than the stability index $S_T$ of a human voice sound.

A male voice index calculator 52 of FIG. 2 calculates a numerical value (hereinafter referred to as "male voice index") $L_{M0}$ serving as an index of the similarity of the input sound $V_{IN}$ and the male speaker sound model $M_M$ for each block of the voice signal $S_{IN}$. Likewise, a female voice index calculator 54 calculates a numerical value (hereinafter referred to as "female voice index") $L_{F0}$ serving as an index of the similarity of the input sound $V_{IN}$ and the female speaker sound model $M_F$ for each block of the voice signal $S_{IN}$.

Elaborating further, the male voice index calculator 52 calculates a numerical value as the male voice index $L_{M0}$ consisting of the probability (likelihood), averaged for all of the characteristic vectors X within the block, that the N characteristic vectors X extracted for each frame of the block occur from the male speaker sound model $M_M$. Similarly, the female voice index calculator 54 calculates a numerical value as the female voice index $L_{F0}$ consisting of the probability, averaged over the block, that the N characteristic vectors X of the block occur from the female speaker sound model $M_F$.

For example, defining the characteristic vector X as a vector in D dimensions, a likelihood $p(X|\lambda)$ of the characteristic vector X coming from the male speaker sound model $M_M$ is calculated by the following formula (3).

$$p(X \mid \lambda) = \sum_{i=1}^{M} p_i b_i(X) \quad (3)$$

$$b_i(X) = \frac{1}{(2\pi)^{\frac{D}{2}} |\Sigma_i|^{\frac{1}{2}}} \exp\left\{ -\frac{1}{2}(X - \mu_i)^T \sum_{i}^{-1} (X - \mu_i) \right\}$$

The male voice index calculator 52 calculates the male voice index $L_{M0}$ by substituting the N characteristic vectors X (X[1] through X[N]) of the block into formula (4).

$$L_{M0} = \frac{1}{N} \sum_{k=1}^{N} \log p(X[k] \mid \lambda) \quad (4)$$

As can be understood from formula (4), a higher similarity of the characteristics of the male speaker sound model $M_M$ and the input sound $V_{IN}$ within the block results in a corresponding increase of the male voice index $L_{M0}$. The female voice index calculator 54 calculates the female voice index $L_{F0}$ by a similar method as that of the male voice index calculator 52. Therefore, a higher similarity of the characteristics of the female speaker sound model $M_F$ and the input sound $V_{IN}$ within the block results in a corresponding increase of the female voice index $L_{F0}$.

An adjuster 56 calculates a new or updated male voice index $L_M$ and a new or updated female voice index $L_F$ for each block by adjusting the male voice index $L_{M0}$ and the female voice index $L_{F0}$ of the block based on the average pitch $P_A$ of each block calculated by the average pitch calculator 42. Elaborating further, the adjuster 56 infers whether the input sound $V_{IN}$ is one of a male voice and a female voice from the average pitch $P_A$; and in the case where a male voice is inferred, the new male voice index $L_M$ is determined by increasing the male voice index $L_{M0}$; and in the case where a female voice is inferred, the new female voice index $L_F$ is determined by increasing the female voice index $L_{F0}$. The inference of men and women according to the average pitch $P_A$ is based on a general trend for the average pitch $P_A$ of a male voice to be lower than the average pitch $P_A$ of a female voice.

Figure 3:
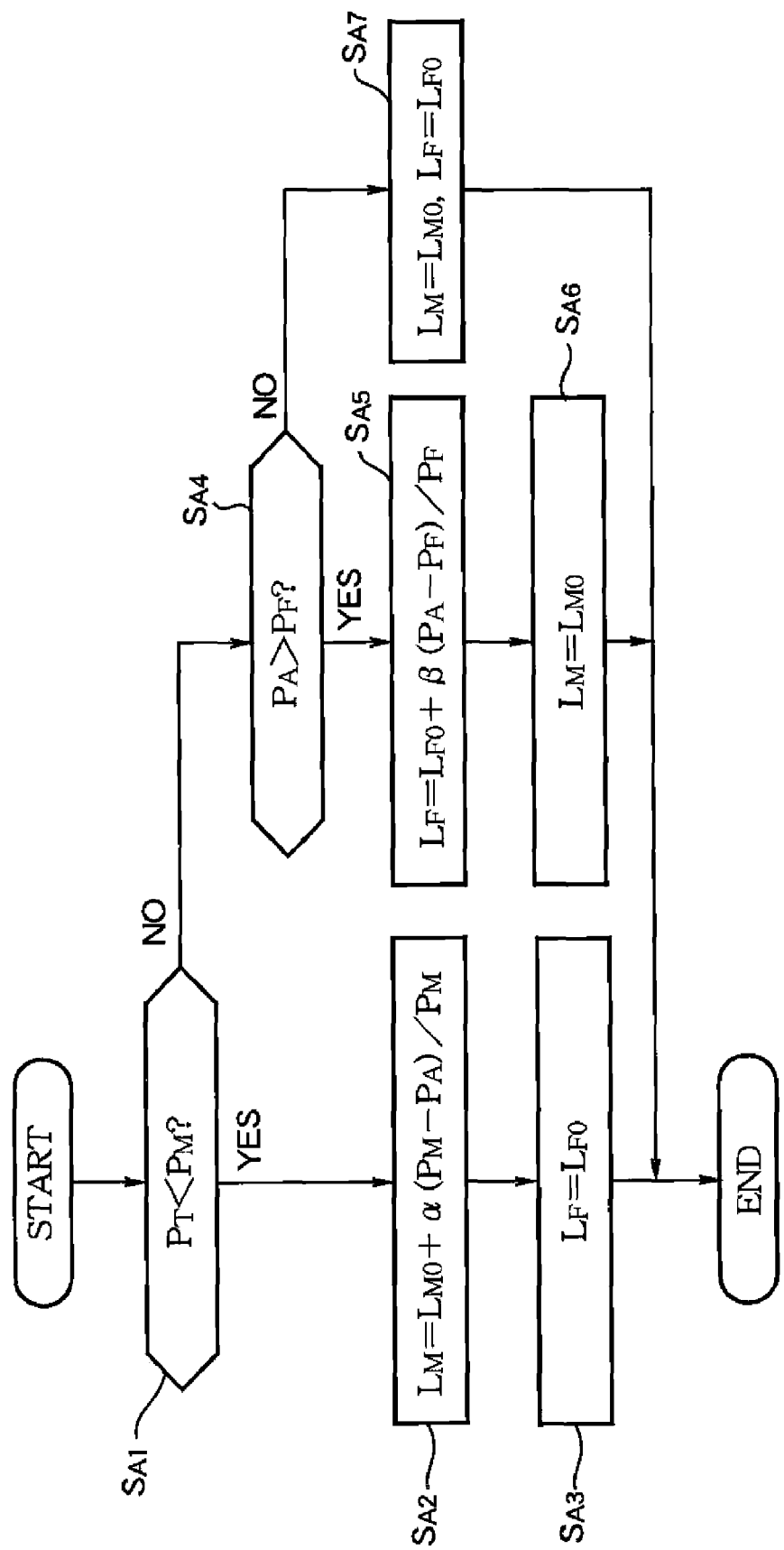
FIG. 3 is a flowchart illustrating details of specific processing by an adjuster contained in the teleconference system.

FIG. 3 is a flowchart illustrating the details of the processing by the adjuster 56. The processing of this drawing is executed for each block of the voice signal $S_{IN}$. In step $S_{A1}$ of FIG. 3, the adjuster 56 determines whether or not the average pitch $P_A$ is lower than a male voice standard pitch $P_M$ (whether or not the input sound $V_{IN}$ of the block can be inferred to be a male voice). The male voice standard pitch $P_M$ is set to a numerical value higher than an average pitch of a male voice (for example 100 Hz).

In the case where the result of step $S_{A1}$ is affirmative (the case where it is inferred from the average pitch $P_A$ that the input sound $V_{IN}$ of the block is a male voice), the adjuster 56 calculates the male voice index $L_M$ by executing the operation of the following formula (5) for the male voice index $L_{M0}$ and the average pitch $P_A$ (step $S_{A2}$).

$$L_M = L_{M0} + \alpha \cdot (P_M - P_A)/P_M \quad (5)$$

The coefficient $\alpha$ of formula (5) is a predetermined positive number. As can be understood from formula (5), an average pitch $P_A$ lower than the male voice standard pitch $P_M$ (in other words, a higher possibility that the input sound $V_{IN}$ of the block is a male voice) results in a correspondingly larger numerical value of the male voice index $L_M$. In step $S_{A3}$ following step $S_{A2}$, the adjuster 56 sets the female voice index $L_F$ to the female voice index $L_{F0}$ and ends the processing of FIG. 3.

On the other hand, in the case where the result of step $S_{A1}$ is negative, the adjuster 56 determines whether or not the average pitch $P_A$ exceeds a female voice standard pitch $P_F$ (whether or not it can be inferred that the input sound $V_{IN}$ of the block is a female voice) (step $S_{A4}$). The female voice standard pitch $P_F$ is set to a numerical value below an average pitch of a female voice (for example 200 Hz).

In the case where the result of step $S_{A4}$ is affirmative (the case where it is inferred from the average pitch $P_A$ that the input sound $V_{IN}$ of the block is a female voice), the adjuster 56 calculates the female voice index $L_F$ by executing the operation of the following formula (6) for the female voice index $L_{F0}$ and the average pitch $P_A$ (step $S_{A5}$).

$$L_F = L_{F0} + \beta \cdot (P_A - P_F)/P_F \quad (6)$$

The coefficient $\beta$ of formula (6) is a predetermined positive number. As can be understood from formula (6), an average pitch $P_A$ higher than the female voice standard pitch $P_F$ (in other words, a higher possibility that the input sound $V_{IN}$ of the block is a female voice) results in a correspondingly larger numerical value of the female voice index $L_F$. In step $S_{A6}$ following step $S_{A5}$, the adjuster 56 sets the male voice index $L_M$ to the male voice index $L_{M0}$ and ends the processing of FIG. 3.

In the case where both results of step $S_{A1}$ and step $S_{A4}$ are negative, it cannot be inferred from the average pitch $P_A$ alone whether the input sound $V_{IN}$ of the block is one of a male voice and a female voice. Therefore, the adjuster 56 sets the male voice index $L_M$ to the male voice index $L_{M0}$ and sets the female voice index $L_F$ to the female voice index $L_{F0}$, and ends the processing of FIG. 3 (step $S_{A7}$). In other words, neither of the male voice index $L_{M0}$ and the female voice index $L_{F0}$ is adjusted. The above description is a specific processing by the adjuster 56.

Figure 4:
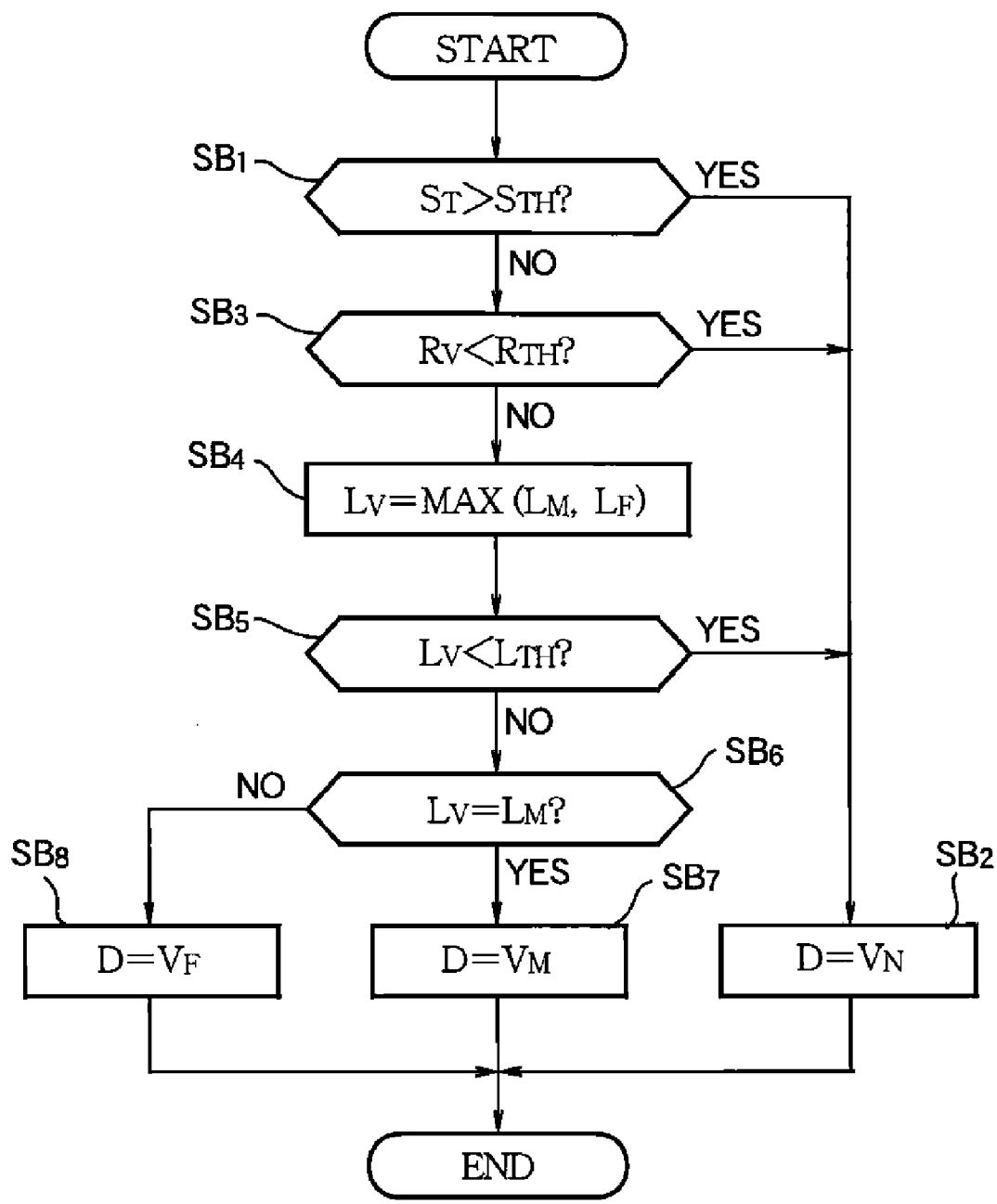
FIG. 4 is a flowchart illustrating details of specific processing by a discriminator of the voice processing device.

A discriminator 62 of FIG. 2 determines whether the input sound $V_{IN}$ of each block is one of a male voice, a female voice, and a non-human voice based on the plurality of kinds of indices ($L_M$, $L_F$, $S_T$, and $R_V$) described above, and outputs identification data D for each block to indicate the distinction of the input sound $V_{IN}$. FIG. 4 is a flowchart illustrating the specific details of the processing by the discriminator 62. The processing of FIG. 4 is executed upon each calculation of the four types of indices ($L_M$, $L_F$, $S_T$, and $R_V$) for one block. Step $S_{B1}$ through step $S_{B5}$ of FIG. 4 are processing that discriminate the input sound $V_{IN}$ between a human voice sound and a non-human-voice sound, and step $S_{B6}$ is processing that discriminates the input sound $V_{IN}$ between a male voice and a female voice.

In step $S_{B1}$, the discriminator 62 determines whether or not the stability index $S_T$ calculated by the stability index calculator 46 exceeds a threshold $S_{TH}$. The stability index $S_T$ of a non-human-voice sound is greater than the stability index $S_T$ of a human voice sound, and therefore in the case where the result of step $S_{B1}$ is affirmative, the discriminator 62 creates the identification data D indicating that the input sound $V_{IN}$ of the block is a non-human voice ($V_N$), and ends the processing of FIG. 4 (step $S_{B2}$).

In the case where the result of step $S_{B1}$ is negative, the discriminator 62 determines whether or not the voice presence index $R_V$ calculated by the voice presence index calculator 44 is lower than the threshold $R_{TH}$ (step $S_{B3}$). The voice presence index $R_V$ of a non-human voice is lower than the voice presence index $R_V$ of a human voice, and therefore in the case where the result of step $S_{B3}$ is affirmative, the discriminator 62 creates the identification data D in step $S_{B2}$ indicating a non-human voice ($V_N$). The threshold $S_{TH}$ and the threshold $R_{TH}$ are selected experimentally or statistically such that the determination of step $S_{B1}$ and step $S_{B3}$ are negative for normal vocal sounds of humans and affirmative for various non-human-voice sounds (for example, air conditioning sounds and sounds of opening and shutting doors, etc. inside the rooms R).

In the case where the result of step $S_{B3}$ is negative, the discriminator 62 sets the human voice index $L_V$ to the larger one of the male voice index $L_M$ and the female voice index $L_F$ calculated by the adjuster 56 (step $S_{B4}$). Then, the discriminator 62 determines whether or not the human voice index $L_V$ is lower than the threshold $L_{TH}$ (step $S_{B5}$). The human voice index $L_V$ of a non-human-voice sound, dissimilar to either of the male speaker sound model $M_M$ and the female speaker sound model $M_F$, is small, and therefore in the case where the result of step $S_{B5}$ is affirmative, the discriminator 62 creates the identification data D in step $S_{B2}$ indicating a non-human voice ($V_N$). The threshold $L_{TH}$ is selected experimentally or statistically such that the determination of step $S_{B5}$ is negative for a normal vocal sound of a human and affirmative for a non-human-voice sound.

In the case where the result of step $S_{B5}$ is negative, it is determined that the input sound $V_{IN}$ of the block is a human voice. In step $S_{B6}$ following step $S_{B5}$, the discriminator 62 determines whether or not the human voice index $L_V$ is the male voice index $L_M$ (in other words, whether or not the male voice index $L_M$ exceeds the female voice index $L_F$). In the case where the result of step $S_{B6}$ is affirmative ($L_M>L_F$), the discriminator 62 determines that the input sound $V_{IN}$ of the block is a male voice. In other words, the discriminator 62 creates the identification data D indicating a male voice ($V_M$) and then ends the processing of FIG. 4 (step $S_{B7}$). On the other hand, in the case where the result of step $S_{B6}$ is negative ($L_M<L_F$), the discriminator 62 creates the identification data D indicating a female voice ($V_F$) and then ends the processing of FIG. 4 (step $S_{B8}$).

A signal processor 66 of FIG. 2 creates a voice signal $S_{OUT}$ by executing a processing of the voice signal $S_{IN}$ of each block according to the identification data D. The details of the processing of the voice signal $S_{IN}$ are selected individually for each block according to the attribute of the input sound $V_{IN}$ of each block (whether it is one of a male voice, a female voice, and a non-human voice).

For example, a male voice generally has meager high frequency components compared to those of a female voice, and is difficult to hear. Therefore, in the case where an identification data D of the block indicates a male voice ($V_M$), the signal processor 66 creates a signal, by applying filter processing that emphasizes the high frequency components (pre-emphasis filter) to the voice signal $S_{IN}$. Of the block, as a voice signal $S_{OUT}$. Moreover, in the case where the sound level of a non-human-voice sound is high, it is difficult to hear the primary voices (the vocal sounds of humans). Therefore, in the case where the identification data D of the block indicates a non-human-voice sound ($V_N$), the signal processor 66 creates a signal, having the sound level of the voice signal $S_{IN}$ of the block reduced, as the voice signal $S_{OUT}$. A female voice often is easy to hear even when unaltered, and therefore in the case where the identification data D of the block indicates a female voice ($V_F$), the signal processor 66 outputs the voice signal $S_{IN}$ of the block as the voice signal $S_{OUT}$ without processing. Therefore, in each of the room $R_1$ and the room $R_2$, clear voices, having emphasized high frequency components of male voices and suppressed non-human-voice sounds, are emitted from a sound emitting device 18 via the voice processing device 16.

As described above, an advantage according to this exemplary embodiment is that the input sound $V_{IN}$ is determined to be a non-human voice or not, and in the case where it is determined not to be a non-human-voice sound (step $S_{B5}$: NO in FIG. 4), it is discriminated between a male voice and a female voice, and therefore even in the case where the input sound $V_{IN}$ includes a non-human-voice sound (namely, noise sound), it is appropriately discriminated as a male voice and a female voice.

Furthermore, a plurality of indices ($S_T$, $R_V$, and $L_V$) are used to discriminate between a human voice and a non-human noise, therefore enabling a discrimination of a human voice and a non-human noise with a higher accuracy than that of configurations using only one index. For example, even in the case where the input sound $V_{IN}$ is abundant with voiced sounds and similar to a human voice, if the stability index $S_T$ is high, the determination as a non-human-voice sound can be made (step $S_{B1}$); and even in the case where the input sound $V_{IN}$ has stable characteristic parameters over time and is similar to a human voice, if the voice presence index $R_V$ is low, the determination as a non-human-voice sound can be made (step $S_{B3}$). Furthermore, even in the case where the input sound $V_{IN}$ has stable characteristic parameters over time and abundant voiced sounds, if the human voice index $L_V$ is low, the determination as a non-human-voice sound can be made (step $S_{B5}$).

Furthermore, the adjuster 56 adjusts (compensates) the male voice index $L_{M0}$ and the female voice index $L_{F0}$ to increase the male voice index $L_M$ in the case where the inference of the input sound $V_{IN}$ as a male voice can be made from the average pitch $P_A$, and increase the female voice index $L_F$ in the case where the inference of the input sound $V_{IN}$ as a female voice can be made from the average pitch $P_A$. Therefore, an advantage is provided that a male voice and a female voice can be clearly discriminated with high accuracy.

B: Second Exemplary Embodiment

In each of the above exemplary embodiments, a Gaussian mixture model λ is used as the male speaker sound model $M_M$ and the female speaker sound model $M_F$. In this exemplary embodiment, the male speaker sound model $M_M$ and the female speaker sound model $M_F$ are VQ (vector quantization) codebooks. In other words, the male speaker sound model $M_M$ defines $n_A$ code vectors $C_A[1]$ through $C_A[n_A]$ corresponding to a distribution of multiple characteristic vectors extracted from the average vocal sounds of a plurality of men. The female speaker sound model $M_F$ defines $n_B$ code vectors $C_B[1]$ through $C_B[n_B]$ corresponding to a distribution of characteristic vectors of the average vocal sounds of a plurality of women. Any known technology such as a k-means algorithm or an LBG algorithm can be used to create the VQ codebook.

The male voice index $L_{M0}$ is a VQ distortion calculated from the male speaker sound model $M_M$ and the N characteristic vectors X of the block. Similarly, the female voice index $L_{F0}$ is a VQ distortion calculated from the female speaker sound model $M_F$ and the N characteristic vectors X. The male voice index calculator 52 calculates the male voice index $L_{M0}$ based on, for example, the following formula (7). In formula (7), $d(C_A[i], X[j])$ is a distance (for example, a Euclidean distance) between the code vector $C_A[i]$ and the characteristic vector $X[j]$.

$$L_{M0} = \frac{1}{N} \sum_{j=1}^{N} \min_{1 \leq i \leq nA} d(C_A[i], X[j]) \tag{7}$$

In other words, the VQ distortion is a numerical value of the minimum (min) distance between the $n_A$ code vectors $C_A[1]$ through $C_A[n_A]$ defined by the male speaker sound model $M_M$ and the characteristic vectors X of the block averaged over the N characteristic vectors $X[1]$ through $X[N]$. Therefore, according to this exemplary embodiment, a stronger similarity of the input sound $V_{IN}$ of each block to the male speaker sound model $M_M$ results in a corresponding decrease of the male voice index $L_{M0}$. The female voice index $L_{F0}$ is calculated by executing an operation similar to that of formula (7) for the $n_B$ code vectors $C_B[1]$ through $C_B[n_B]$ and the N characteristic vectors X. Therefore, a stronger similarity of the input sound $V_{IN}$ of each block to the female speaker sound model $M_F$ results in a corresponding decrease of the female voice index $L_{F0}$.

Regarding the processing of FIG. 3, in the case of the average pitch $P_A$ being lower than the male voice standard pitch $P_M$ (step $S_{A1}$: YES), the adjuster 56 reduces the male voice index $L_{M0}$ according to the average pitch $P_A$, and thereby calculates the male voice index $L_M$ (step $S_{A2}$ of FIG. 3). Similarly, in the case where the average pitch $P_A$ exceeds the female voice standard pitch $P_F$ (step $S_{A4}$), the adjuster 56 reduces the female voice index $L_{F0}$ according to the average pitch $P_A$, and thereby calculates the female voice index $L_F$ (step $S_{A5}$ of FIG. 3).

In step $S_{B4}$ of FIG. 4, the discriminator 62 sets the human voice index $L_V$ to the smaller one of the male voice index $L_M$ and the female voice index $L_F$; and in step $S_{B5}$, in the case where the human voice index $L_V$ exceeds the threshold $L_{TH}$, the input sound $V_{IN}$ is determined to be a non-human-voice sound, and in the case where the human voice index $L_V$ is lower than the threshold $L_{TH}$, the input sound $V_{IN}$ is determined to be a human voice.

Furthermore, in step $S_{B6}$, in the case where the male voice index $L_M$ is lower than the female voice index $L_F$, the discriminator 62 determines the input sound $V_{IN}$ to be a male voice, and in the case where the male voice index $L_M$ exceeds the female voice index $L_F$, it determines the input sound $V_{IN}$ to be a female voice. By the above configuration as well, a similar effect is provided as that of the first exemplary embodiment.

C: Modifications

Various modifications may be made to each of the above exemplary embodiments. Specific modified aspects are illustrated as follows. Additionally, any two or more aspects may be selected from the following illustrations and combined.

(1) First Modification

In each of the above exemplary embodiments, the voice processing device 14 in the room R where the input sound $V_{IN}$ is captured creates the identification data D and the voice signal $S_{OUT}$, but the location of the creation of the identification data D and the location of the creation of the voice signal $S_{OUT}$ may be modified as needed.

Figure 5:
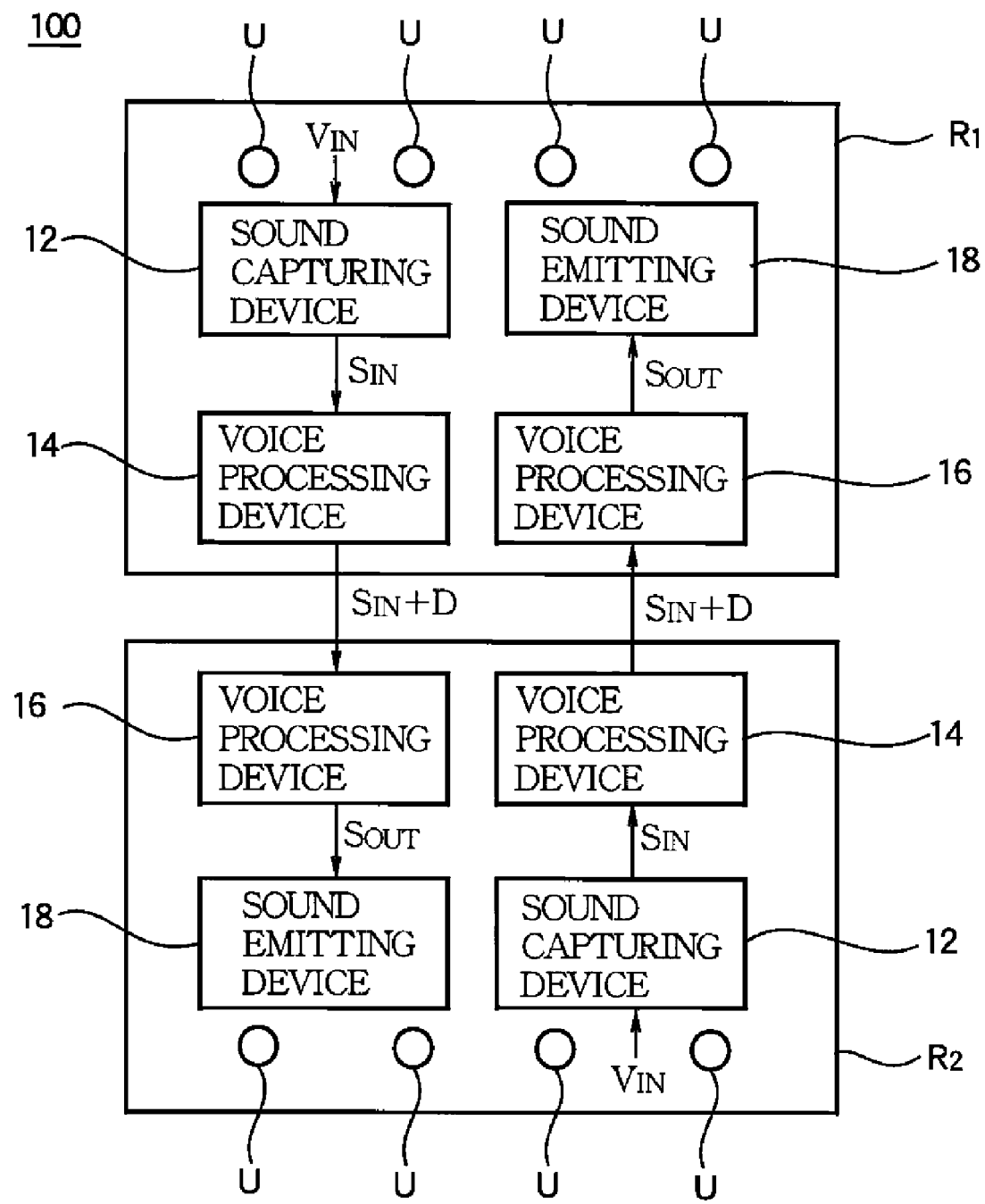
FIG. 5 is a block diagram illustrating a configuration of a teleconference system according to a modification.

For example, in the teleconference system 100 of FIG. 5, the voice processing device 14 placed in each of the room $R_1$ and the room $R_2$ does not have the signal processor 66 of FIG. 2, and outputs the voice signal $S_{IN}$ supplied from the sound capturing device 12 and the identification data D created by the discriminator 62 for each block of the voice signal $S_{IN}$. Each voice processing device 16 of the room $R_1$ and the room $R_2$ includes a signal processor 66 similar to that of FIG. 2 (not illustrated in FIG. 5). The signal processor 66 of the voice processing device 16 creates the voice signal $S_{OUT}$ from the voice signal $S_{IN}$ and the identification data D received from the other room R and outputs to the sound emitting device 18. The voice signal $S_{OUT}$, similarly to the first exemplary embodiment, is a signal made by processing the voice signal $S_{IN}$ according to the identification data D.

Figure 6:
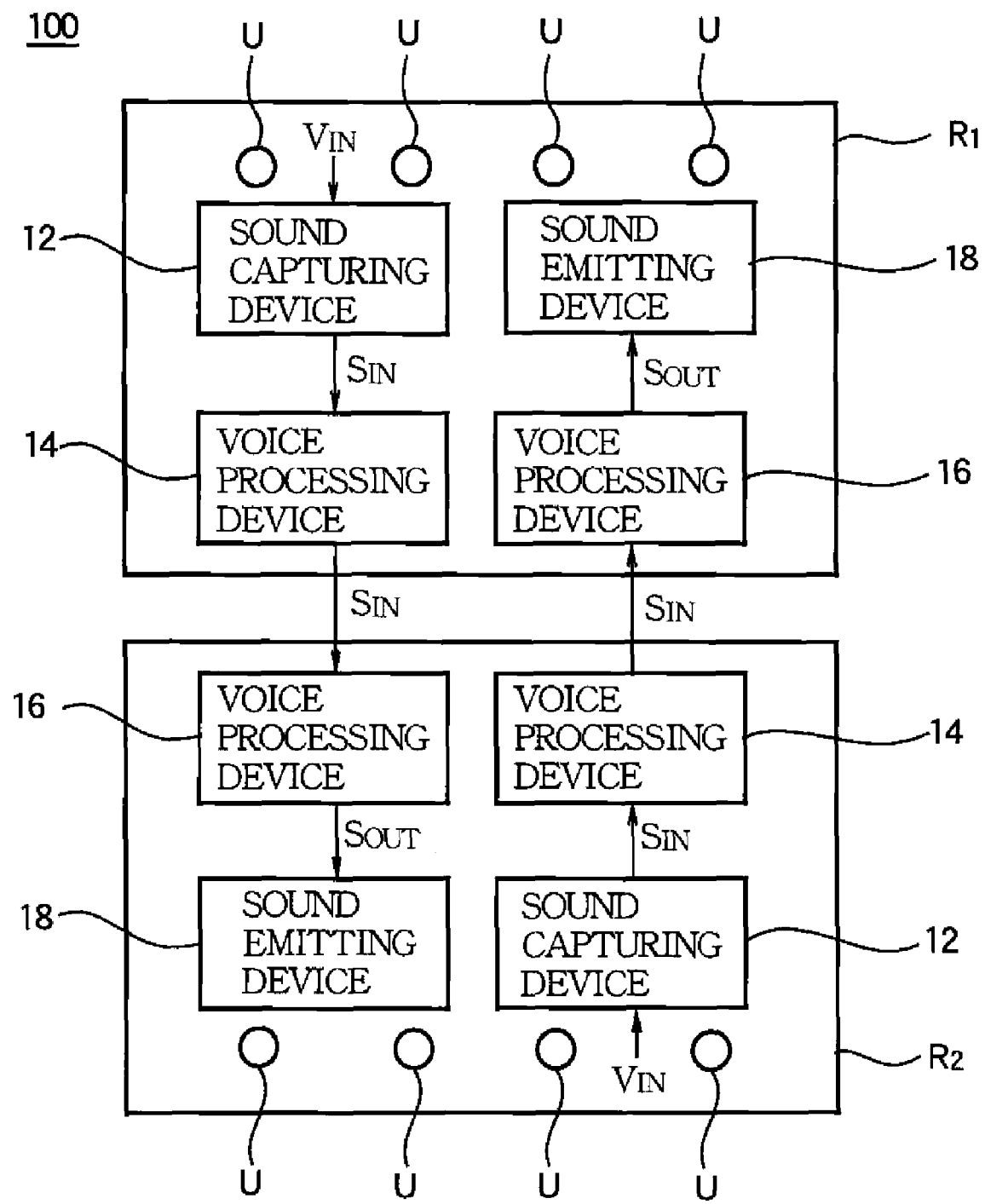
FIG. 6 is a block diagram illustrating a configuration of a teleconference system according to a modification.

Furthermore, in the teleconference system 100 of FIG. 6, the voice processing device 14 placed in each of the room $R_1$ and the room $R_2$ sends the voice signal $S_{IN}$ supplied from the sound capturing device 12 to the other room R. The voice processing device 16 placed in each of the room $R_1$ and the room $R_2$ includes a configuration similar to that of FIG. 2, creates the voice signal $S_{OUT}$ from the voice signal $S_{IN}$ received from the other room R, and outputs to the sound emitting device 18.

(2) Second Modification

In each of the above exemplary embodiments, the male voice index $L_{M0}$ and the female voice index $L_{F0}$ are adjusted according to the average pitch $P_A$, but constituents for determining necessity of an adjustment and the adjustment amount are not limited to the average pitch $P_A$. For example, a configuration may be used wherein the male voice index $L_{M0}$ and the female voice index $L_{F0}$ are adjusted based on one of the pitches $P_0$ detected by the pitch detector 36 for the N frames of the block. Additionally, the adjuster 56 and the average pitch calculator 42 may be omitted. In a configuration in which the adjuster 56 is omitted, the discriminator 62 sets the human voice index $L_V$ to the greater one of the male voice index $L_{M0}$ and the female voice index $L_{F0}$ in step $S_{B4}$ of FIG. 4; and in step $S_{B6}$, in the case where the male voice index $L_{M0}$ exceeds the female voice index $L_{F0}$, the input sound $V_{IN}$ is determined to be a male voice, and otherwise in the case where the male voice index $L_{M0}$ is lower than the female voice index $L_{F0}$, the input sound $V_{IN}$ is determined to be a female voice.

(3) Third Modification

Any method for discriminating the input sound $V_{IN}$ between a human voice and a non-human noise may be used. For example, a configuration may be used wherein the processing of one or more of step $S_{B1}$, step $S_{B3}$, and step $S_{B5}$ in FIG. 4 is omitted. Furthermore, in the case where the trend for the sound level of a human voice to often exceed the sound level of a non-human noise is set forth as a premise, a configuration may be used wherein the input sound $V_{IN}$ of a block having a sound level exceeding the threshold is determined to be a human voice, and the input sound $V_{IN}$ of a block having a sound level lower than the threshold is determined to be a non-human noise.

(4) Fourth Modification

The relationship between the magnitude of the human voice index $L_V$ and the discrimination between a human voice/a non-human sound in the first exemplary embodiment and the second exemplary embodiment is reversed. In other words, according to the first exemplary embodiment, the case where the human voice index $L_V$ is large, the input sound $V_{IN}$ is determined to be a human voice, while according to the second exemplary embodiment, in the case where the human voice index $L_V$ is small, the input sound $V_{IN}$ is determined to be a human voice. Other indices ($S_T$ and $R_V$) illustrated in each of the above exemplary embodiments as well similarly may modify the relationships as needed between the magnitude of the indices and the discrimination between a human voice/a non-human sound.

For example, a configuration that calculates the stability index $S_T$ is supposed wherein a high stability of the input sound $V_{IN}$ of the block results in a corresponding increase of the stability index $S_T$. For example, the reciprocal of the right portion of formula (2) is calculated as the stability index $S_T$. The discriminator 62, converse to that of the first exemplary embodiment, in the case where the stability index $S_T$ is lower than the threshold $S_{TH}$, determines the input sound $V_{IN}$ to be a non-human sound; and in the case where the stability index $S_T$ exceeds the threshold $S_{TH}$, determines the input sound $V_{IN}$ to be a human voice. The relationships between the magnitude of the stability index $S_T$ and the degree of the stability of the input sound $V_{IN}$ in both the first exemplary embodiment and this modification are similar in that in the case where the stability index $S_T$ is on the stable side of the threshold $S_{TH}$, the input sound $V_{IN}$ is determined to be a human voice, and in the case where the stability index $S_T$ is on the unstable side of the threshold $S_{TH}$, the input sound $V_{IN}$ is determined to be a non-human sound.

Next, a configuration that calculates the voice presence index $R_V$ is supposed wherein a high ratio of voiced-sound frames within the block results in a corresponding decrease of the voice presence index $R_V$. For example, the ratio of the number $N_N$ of non-voiced-sound frames within the N frames of the block ($R_V=N_N/N$) is calculated as the voice presence index $R_V$. Therefore, the voice presence index $R_V$ for a human voice is a smaller number than the voice presence index $R_V$ of a non-human sound. The discriminator 62 determines the input sound $V_{IN}$ to be a non-human sound in the case where the voice presence index $R_V$ exceeds the threshold $R_{TH}$, and determines the input sound $V_{IN}$ to be a human voice in the case where the voice presence index $R_V$ is lower than the threshold $R_{TH}$. The relationships between the magnitude of the voice presence index $R_V$ and the discrimination of a human voice/a non-human sound in both the first exemplary embodiment and this modification are similar in that in the case where the voice presence index $R_V$ is on the side of the threshold $R_{TH}$ of decreasing voiced-sound frames (the side of increasing non-voiced-sound frames), the input sound $V_{IN}$ is determined to be a non-human-voice sound, and in the case where the voice presence index $R_V$ is on the side of the threshold $R_{TH}$ of increasing voiced-sound frames (the side of decreasing non-voiced-sound frames), the input sound $V_{IN}$ is determined to be a human voice.

(5) Fifth Modification

Any detail of processing by the signal processor 66 is possible. For example, a configuration that increases the sound level of the voice signal $S_{IN}$ for a block determined to be a male voice ($V_M$), or a configuration that decreases the sound level of the voice signal $S_{IN}$ for a block determined to be a female voice ($V_F$) may be used. Furthermore, regarding a configuration that classifies, for example, each block of the voice signal $S_{IN}$ into, for example, distinct male voice and female voice clusters, or a configuration that classifies the voice signal $S_{IN}$ into distinct clusters for each speaker, it is also favorable for a configuration to exclude blocks discriminated as a non-human-voice sound from the scope of the classification.

(6) Sixth Modification

In each of the above exemplary embodiments, the voice signal $S_{IN}$ is classified into three types of sounds (a male voice sound, a female voice sound, and a non-human-voice sound), but a configuration that classifies the voice signal $S_{IN}$ further into many types also may be used. For example, an index (hereinafter referred to as "child index") is calculated for the similarity of a speaker sound model created from an average voice of a plurality of children and N characteristic vectors X based on a comparison thereof. The discriminator 62, in the case where the human voice index $L_V$ set in step $S_{B4}$ of FIG. 4 is the child index, determines the input sound $V_{IN}$ to be the vocal sound of a child.

The invention claimed is:

1. A voice processing device for discriminating an input sound among a male voice sound, a female voice sound and a non-human-voice sound other than the male voice sound and the female voice sound, the voice processing device comprising:
   a storage that stores a male speaker sound model created from sounds voiced from a plurality of male speakers and a female speaker sound model created from sounds voiced from a plurality of female speakers;
   a male voice index calculator that calculates a male voice index indicating a similarity of the input sound relative to the male speaker sound model;
   a female voice index calculator that calculates a female voice index indicating a similarity of the input sound relative to the female speaker sound model;
   a first discriminator that discriminates the input sound between the non-human-voice sound and a human voice sound which may be either of the male voice sound or the female voice sound; and
   a second discriminator that discriminates the input sound between the male voice sound and the female voice sound based on the male voice index and the female voice index in case that the first discriminator discriminates the human voice sound.

2. The voice processing device according to claim 1, further comprising a stability index calculator that calculates a stability index indicating a stability of a characteristic parameter of the input sound along passage of time, wherein the first discriminator discriminates the input sound between the non-human-voice sound and the human voice sound based on the stability index.

3. The voice processing device according to claim 2, wherein the stability index calculator obtains a difference of the characteristic parameter of the input sound between a preceding frame and a succeeding frame which are successively selected from a plurality of frames which are obtained by sequentially dividing the input sound, and calculates the stability index by averaging the differences of the characteristic parameter of the input sound over the plurality of the frames, and wherein the first discriminator determines the input sound to be the human voice sound in case that the stability index is lower than a threshold value and determines the input sound to the non-human-voice sound in case that the stability index exceeds the threshold value.

4. The voice processing device according to any one of claim 1 through claim 3, further comprising a voice presence index calculator that calculates a voice presence index according to a ratio of a number of frames containing a voiced sound relative to a plurality of frames which are obtained by sequentially dividing the input sound, wherein the first discriminator discriminates the input sound between the non-human-voice sound and the human voice sound based on the voice presence index.

5. The voice processing device according to claim 1, wherein the first discriminator uses a threshold which defines a similarity range and a non-similarity range of the male voice index and the female voice index, and determines the input sound to be the human voice sound in case that one of the male voice index and the female voice index is in the similarity range, and otherwise determines the input sound to be the non-human-voice sound in case that both of the male voice index and the female voice index are in the non-similarity range.

6. The voice processing device according to claim 1, further comprising: a pitch detector that detects a pitch of the input sound; and an adjuster that adjust the male voice index toward a similarity side in case that the detected pitch is below a predetermined value, and adjusts the female voice index toward a similarity side in case that the detected pitch exceeds a predetermined value, wherein the second discriminator discriminates the input sound between the male voice sound and the female voice sound based on either of the adjusted male voice index and the adjusted female voice index.

7. The voice processing device according to claim 1, further comprising a signal processor that executes different processing of the input sound according to discrimination results of the first discriminator and the second discriminator.

8. A non-transitory machine readable medium for use in a computer, the medium containing program instructions executable by the computer to perform:
- a male voice index calculation processing of calculating a male voice index indicating a similarity of an input sound relative to a male speaker sound model created from a plurality of male voice sounds;
- a female voice index calculation processing of calculating a female voice index indicating a similarity of the input sound relative to a female speaker sound model created from a plurality of female voice sounds;
- a first discrimination processing of discriminating the input sound between a human voice sound and a non-human-voice sound; and
- a second discrimination processing of discriminating the input sound between a male voice sound and a female voice sound based on the male voice index and the female voice index in case that the first discrimination processing discriminates the human voice sound.

\* \* \* \* \*